(12) United States Patent  
Smirniotis et al.

(10) Patent No.: US 8,114,808 B2
(45) Date of Patent: Feb. 14, 2012

(54) SULFUR TOLERANT HIGHLY DURABLE $CO_2$ SORBENTS

(75) Inventors: Panagiotis G. Smirniotis, Cincinnati, OH (US); Hong Lu, Urbana, IL (US)

(73) Assignee: University of Cincinnati, Cincinnati, OH (US)

( * ) Notice: Subject to any disclaimer, the term of this patent is extended or adjusted under 35 U.S.C. 154(b) by 137 days.

(21) Appl. No.: 12/635,061

(22) Filed: Dec. 10, 2009

(65) Prior Publication Data

US 2010/0139486 A1 Jun. 10, 2010

Related U.S. Application Data

(60) Provisional application No. 61/121,347, filed on Dec. 10, 2008.

(51) Int. Cl.
*B01D 53/02* (2006.01)

(52) U.S. Cl. .......... 502/400; 502/406; 502/411; 95/900; 95/139; 96/108

(58) Field of Classification Search .......... 95/139, 95/140, 183, 900; 96/121, 144, 108; 502/400, 502/406, 411; 423/220, 230, 594.16, 635
See application file for complete search history.

(56) References Cited

U.S. PATENT DOCUMENTS

| 5,520,894 | A | * | 5/1996 | Heesink et al. | 423/230 |
| 6,306,793 | B1 | * | 10/2001 | Turk et al. | 502/216 |
| 2005/0230659 | A1 | * | 10/2005 | Hampden-Smith et al. | 252/189 |

OTHER PUBLICATIONS

H. Lu, E, Reddy and P. Smirniotis, "Calcium Oxide Based Sorbents for Capture of Carbon Dioxide at High Temperatures" (Ind. Eng. Chem. Res. 2006, 45, 3944-3949).*

E. Reddy and P. Smirniotis, "High Temperature Sorbents for Carbon Dioxide Made of Alkali Metals Doped on CaO Supports" (J. Phys. Chem. B, vol. 108, No. 23., 2004, 7794-7800).*

H. Gupta and L.S. Fan, "Carbonation-Calcination Cycle Using High Reactivity CaO for Carbon Dioxide Separation from Flue Gas" (Ind. Eng. Chem. Res., 2002, 41, 4035-4042).*

P. Sun et al, The Effect of CaO Sintering on Cyclic CO2 Capture in Energy Systems, Environmental and Energy Engineering, Sep. 2007, vol. 53, No. 9, pp. 2432-2442.

C. Martavaltzi et al, Development of New CaO Based Sorbent Materials for CO2 Removal at High Temperature, Microporous and Mesoporous Materials 110, 2008, pp. 119-127.

H. Lu et al, Relationship Between Structural Properties and CO2 Capture Performance of CaO-Based Sorbents Obtained from Different Organometallic Precursors, Ind. Eng. Chem. Res. 2006, 45, pp. 3944-3949.

K. Kuramoto et al, Repetitive Carbonation-Calcination Reactions of Ca-Based Sorbents for Efficient CO2Sorption at Elevated Temperatures and Pressures, Industrial & Engineering Chemistry Research, 2003, 42, pp. 975-981.

D. Aaron et al, Separation of CO2 from Flue Gas: A Review, Separation Science and Technology, 2005, 40, pp. 321-348.

(Continued)

*Primary Examiner* — Duane Smith
*Assistant Examiner* — Pankti Patel
(74) *Attorney, Agent, or Firm* — Dinsmore & Shohl LLP

(57) ABSTRACT

A sorbent for the capture of carbon dioxide from a gas stream is provided, the sorbent containing calcium oxide (CaO) and at least one refractory dopant having a Tammann temperature greater than about 530° C., wherein the refractory dopant enhances resistance to sintering, thereby conserving performance of the sorbent at temperatures of at least about 530° C. Also provided are doped CaO sorbents for the capture of carbon dioxide in the presence of $SO_2$.

14 Claims, 11 Drawing Sheets

OTHER PUBLICATIONS

E. P. Reddy et al, High Temperature Sorbents for CO2 Made of Alkali Metals Doped on CaO Supports, Jourinal of Physical Chemistry B, 2004, 108, pp. 7794-7800.

J. C. Abanades et al, Sorbent Cost and Performance in CO2 Capture Systems, Ind. Eng. Chem. Res. 2004, 43, pp. 3462-3466.

J. C. Abanades et al, The Maximum Capture Efficiency of CO2 Using a Carbonation/Calcination Cycle of CaO/ CaCO3, Chemical Engineering Journal 90 (2002), pp. 303-306.

R. Barker, The Reversability of the Reaction CaCO3=CaO+CO2, J. Appl. Chem. Biotechnol., 1973, 23, pp. 733-742.

V. Manovic et al, Parametric Study on the CO2 Capture Capacity of CaO-Based Sorbents in Looping Cycles, Energy & Fuels, 2008, 22, pp. 1851-1857.

R. H. Borgwardt et al, An investigation of product-layer diffusivity for calcium oxide sulfation. Industrial & Engineering Chemistry Research 1987, 26, pp. 1993-1998.

H. Lu et al, Calcium Oxide Based Sorbents for Capture of Carbon Dioxide at High Temperatures. Ind. Eng. Chem. Res. 2006, 45, pp. 3944-3949.

G. S. Grasa et al, CO2 capture capacity of CaO in long series of carbonation/calcination cycles. Industrial & Engineering Chemistry Research 2006, 45, 8846-8851.

P.H.M. Feron et al, CO2 capture process principles and costs. Oil & Gas Science and Technology-Revue De L Institut Francais Du Petrole 2005, 60, 451-459.

J. C. Abanades et al, Conversion limits in the reaction of CO2 with lime. Energy & Fuels 2003, 17, pp. 308-315.

J. C. Abanades et al, Cost Structure of a Postcombustion CO2 Capture System Using CaO. Environ. Sci. Technol. 2007, 41, pp. 5523-5527.

A. Mackenzie et al, Economics of CO2 capture using the calcium cycle with a pressurized fluidized bed combustor. Energy & Fuels 2007, 21, pp. 920-926.

Z. S. Li et al, Effect of preparation temperature on cyclic CO2 capture and multiple carbonation-calcination cycles for a new Ca-based CO2 sorbent. Industrial & Engineering Chemistry Research 2006, 45, pp. 1911-1917.

S. K. Bhatia et al, Effect of the Product Layer on the Kinetics of the CO2-Lime Reaction. Aiche Journal 1983, 29, pp. 79-86.

M. V. Iyer et al, Multicyclic study on the simultaneous carbonation and sulfation of high-reactivity CaO. Industrial and Engineering Chemistry Research 2004, 43, pp. 3939-3947.

Z. Yong et al, Adsorption of carbon dioxide at high temperature—A Review. Separation and Purification Technology 2002, 26, pp. 195-205.

H. Gupta et al, Carbonation/Calcination Cycle Using High Reactivity Calcium Oxide for Carbon Dioxide Separation from Flue Gas. Industrial & Engineering Chemistry Research 2002, 41, pp. 4035-4042.

* cited by examiner

US 8,114,808 B2

SULFUR TOLERANT HIGHLY DURABLE CO$_2$ SORBENTS

RELATED APPLICATION

This application claims the benefit of U.S. Provisional Application No. 61/121,347, filed Dec. 10, 2008, which application is hereby incorporated by reference in its entirety.

FEDERALLY SPONSORED RESEARCH OR DEVELOPMENT

The presently disclosed invention and its respective embodiments were made with U.S. Government support under Grant No. DE-FG26-03NT41810, awarded by the Department of Energy. The government has certain rights in this invention.

FIELD OF THE INVENTION

The present invention relates generally to sorbents and their methods of use in removing carbon dioxide (CO$_2$) from anthropogenic sources. More specifically, the present invention relates to doped calcium oxide (CaO) sorbents for capturing CO$_2$ from gaseous streams.

BACKGROUND OF THE INVENTION

Carbon dioxide (CO$_2$) is emitted from common combustion systems and contributes to air pollution. In order to preserve the environment and reduce the emissions of CO$_2$, one approach is to capture and sequester CO$_2$ during industrial processes, before the gas is released into the atmosphere.

The most common commercial technology for capturing CO$_2$ is an amine-based absorption system. However, amine-based systems are limited to relatively small scale (10$^2$ ton/day) and low temperature use (between about 49° C. and 140° C.). One approach for overcoming the limitations of amine-based systems is the use of calcium oxide (CaO) inorganic sorbents. However, conventional CaO sorbents have limitations, as well. The performance of conventional CaO sorbents decays with each carbonation/decarbonation cycle. Conventional CaO sorbents sinter at temperatures at or above about 530° C., which also adversely affects the surface area of the sorbent and its CO$_2$-capturing properties. Further, the presence of water vapor in flue gas also reduces the performance of conventional CaO sorbents. Accordingly, a need exists to develop improved CaO sorbents which exhibit high durability under extreme conditions including high temperature and the presence of water vapor.

Along with scale and temperature limitations, conventional CaO sorbents are also susceptible to sulfation by sulfur gases. Carbon dioxide (CO$_2$) and sulfur gases (SO$_2$ and, to a lesser degree, SO$_3$) are emitted together in many common combustion systems. Sulfur gas contaminants adversely affect the performance of CaO-based sorbents, due to reaction competition between carbonation and sulfation. Further, while the carbonation reaction is generally reversible in traditional CaO sorbents, the sulfation reaction is not reversible and accounts for permanent residual weight gain across multiple carbonation/regeneration cycles. Accordingly, a need exists to develop improved CaO sorbents which maintain CO$_2$-capturing properties in the presence of sulfate gas.

SUMMARY OF THE INVENTION

Refractory-doped CaO sorbents produced by Flame Spray Pyrolysis (FSP) are durable at high temperatures and retain function across multiple carbonation/decarbonation cycles under extreme operating conditions, including temperatures above about 530° C. and the presence of water vapor. Metal oxide-doped CaO sorbents enhance sorbent resistance to sulfation, conserving CO$_2$-capturing properties in the presence of sulfur-containing gases such as SO$_2$ and SO$_3$.

In one embodiment of the present invention, a sorbent for the capture of carbon dioxide (CO$_2$) from gas comprising CO$_2$ is provided, the sorbent comprising calcium oxide (CaO) and at least one refractory dopant having a Tammann temperature greater than about 530° C., wherein the refractory dopant enhances resistance to sintering, thereby conserving a nanostructure of the sorbent at temperatures of at least about 530° C.

In another embodiment, a process for manufacturing a sorbent for the capture of CO$_2$ from gas comprising CO$_2$ is provided, the process comprising flame spray pyrolysis of a calcium precursor and at least one refractory dopant precursor to provide a refractory-doped nanoparticulate CaO sorbent.

In another embodiment, a sorbent for the capture of carbon dioxide (CO$_2$) from gas comprising CO$_2$ and SO$_2$ is provided, the sorbent comprising calcium oxide (CaO) and at least one metal oxide dopant, wherein the metal oxide dopant enhances sorbent resistance to sulfation, thereby conserving the CO$_2$-capturing properties of the sorbent in the presence of SO$_2$.

In another embodiment, a process for manufacturing a sorbent for the capture of CO$_2$ from gas comprising CO$_2$ and SO$_2$ is provided, the process comprising flame spray pyrolysis of a calcium precursor and at least one metal oxide dopant precursor to provide a metal oxide-doped nanoparticulate CaO sorbent.

These and other objects, features, embodiments, and advantages will become apparent to those of ordinary skill in the art from a reading of the following detailed description and the appended claims.

DETAILED DESCRIPTION OF THE INVENTION

Figure 1:
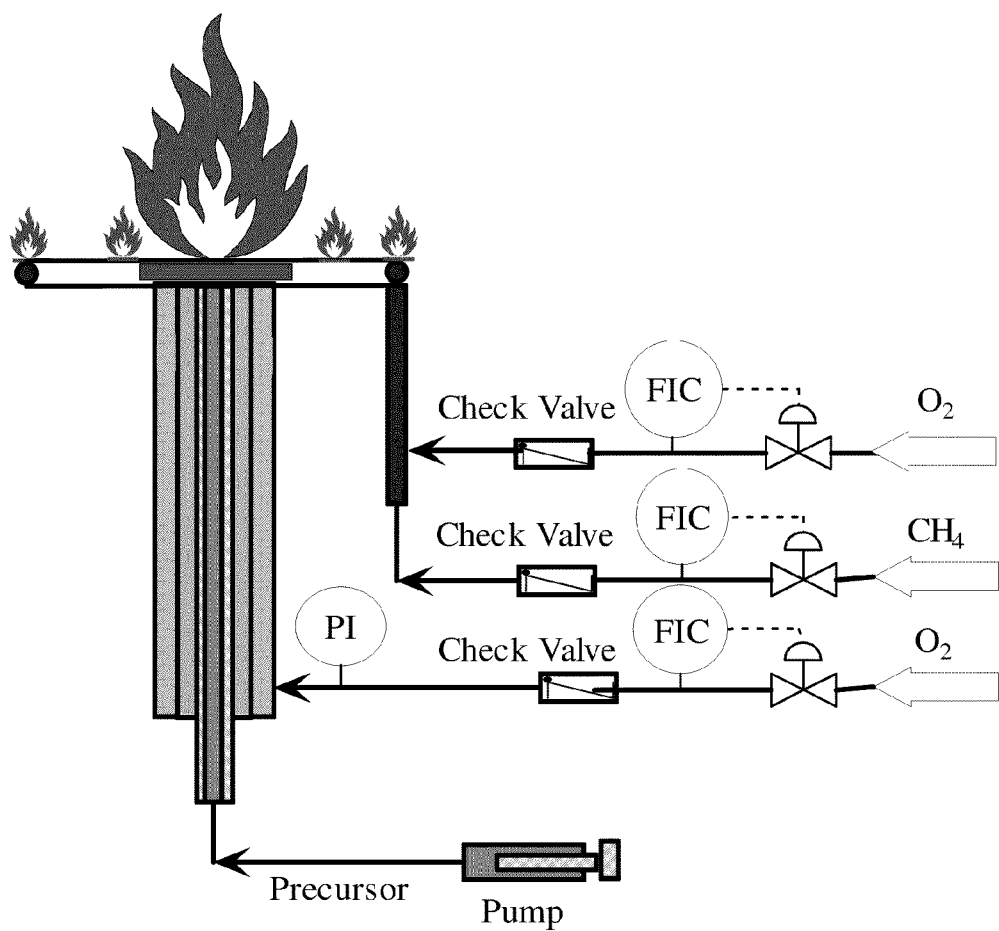
FIG. 1. Schematic view of the experimental design of flame spray pyrolysis using an O$_2$-assisted dispersion spray nozzle and seven supporting CH$_4$/O$_2$ flames around (not to scale). The precursors are dispersed by oxygen and form nanoparticles, which are collected at a filter above the flame.

The following terms are used in the present application:

The term "sorbent," as used herein, refers to a material capable of taking up another substance, either by absorption, adsorption, or desorption. The sorbents of the embodiments of the present invention adsorb $CO_2$ based on the reversible reaction between CaO and $CO_2$, leading to the formation of $CaCO_3$ as follows:

$$CaO + CO_2 \leftrightarrow CaCO_3$$

The term "dopant," as used herein, refers to an auxiliary substance added to a primary substance in order to change its physical or chemical properties and/or promote its performance.

The term "refractory dopant," as used herein, refers to a dopant which does not melt or sinter at operation conditions. Accordingly, refractory dopants added to CaO enhance sintering resistance and durability of CaO sorbents at high temperatures (e.g., at or above the Tammann temperature for $CaCO_3$). In one embodiment, refractory dopants include those metal oxide compounds having Tammann temperatures greater than that of $CaCO_3$, or greater than about 530° C. Suitable refractory dopants include, but are not limited to, silicon (Si), scandium (Sc), titanium (Ti), vanadium (V), chromium (Cr), manganese (Mn), iron (Fe), cobalt (Co), nickel (Ni), copper (Cu), zinc (Zn), gallium (Ga), yttrium (Y), zirconium (Zr), niobium (Nb), molybdenum (Mo), hafnium (Hf), tantalum (Ta), tungsten (W), lanthanum (La), cerium (Ce), samarium (Sm), and mixtures thereof. In another embodiment, refractory dopants are selected from the group consisting of silicon, titanium, chromium, cobalt, cerium, zirconium, and mixtures thereof.

The term "Tammann temperature," as used herein, refers to the temperature at or above which a solid material begins to sinter significantly. The Tammann temperature is unique to a solid material, and is roughly about 50-75% of the bulk melting temperature for a solid substance. Table 1 below lists the Tammann temperatures for CaO, $CaCO_3$, and a non-exhaustive list of refractory dopants suitable for use in the sorbents of the present invention.

TABLE 1

| Tammann Temperatures | | |
|---|---|---|
| Compound | Melting temperature (° C.) | Tammann temperature$^a$ (° C.) |
| CaO | 2613 | 1170 |
| CaCO₃ | 1339 | 533 |
| SiO₂ | 1722 | 725 |
| CoO | 1830 | 779 |

TABLE 1-continued

| Tammann Temperatures | | |
|---|---|---|
| Compound | Melting temperature (° C.) | Tammann temperature$^a$ (° C.) |
| TiO₂ | 1843 | 785 |
| Cr₂O₃ | 2329 | 1028 |
| CeO₂ | 2400 | 1064 |
| ZrO₂ | 2709 | 1218 |

The term "sintering," as used herein, refers to the physical change to particles of a substance which occurs at or above the Tammann temperature. Sintering is always accompanied by agglomeration, which, in the case of the CaO sorbents of the present invention, results in reduction of specific surface area, pore shrinkage, and a deterioration in the performance of the sorbent.

The terms "nanoparticle" or "nanoparticulate" refer to particles having diameters in the nanometer range (1-100 nm). The term "nanostructure," as used herein, refers to the physical properties of a substance comprised of nanoparticles. Physical properties characteristic of the nanostructure of the CaO sorbents of the present invention include, inter alia, pore size and specific surface area of the sorbent.

The term "gas stream," as used herein, refers to gaseous bi-products resulting from industrial processes. Gas streams comprising $CO_2$ are produced in a variety of operations, including but not limited to fossil fuel combustion, fossil fuel reforming, or gasification. Gas streams may be flue gas streams, resulting from fuel combustion or other industrial processes wherein gaseous exhaust is produced.

The term "carbonation capacity," as used herein, refers to the capacity of a sorbent to convert CaO to $CaCO_3$. Carbonation capacity is expressed as a percentage of 100%*mol of CaO to $CaCO_3$/mol of CaO.

The term "specific surface area," as used herein, refers to the surface area per unit weight of particles. Specific surface area is often assessed using the Brunauer-Emmett-Teller, or BET theory, and is expressed as m²/gram.

The term "pore volume," as used herein, refers to the volume of the pores in a given substance. Pore volume is assessed using nitrogen adsorption and desorption isotherms at −196° C. and is expressed as cm³/gram.

The term "monotonic," as used herein, refers to a function wherein the successive values are increasing, decreasing, or constant.

The terms "flame spray pyrolysis" or "FSP," as used herein, refer to a technique for converting precursor droplets into solid nanoparticles in flames. FSP allows for the controlled synthesis of nanoparticles with high specific surface area. The term "precursor," as it relates to FSP, refers to the chemical substances from which a sorbent is synthesized.

The term, "metal oxide dopant," as used herein, refers to metal oxide compounds suitable for addition to CaO sorbents to promote performance. In one embodiment of the invention, the metal oxide dopant promotes performance by enhancing sorbent resistance to sulfation in the presence of $SO_2$. Suitable metal oxide dopants for enhancing resistance to sulfation include, but are not limited to, oxides of metals such as manganese, cerium, chromium, cobalt, copper, and mixtures thereof.

Capture of $CO_2$ by CaO sorbents is based on the reversible reactions between CaO and $CO_2$ leading to the formation of $CaCO_3$ as follows:

$$CaO + CO_2 \leftrightarrow CaCO_3$$

The term "carbonation" refers to the reaction forming $CaCO_3$ from CaO and $CO_2$. The terms "decarbonation," "regeneration," or desorption refer to the formation of CaO and $CO_2$ from $CaCO_3$. The capture efficiency for Ca-based sorbents is only limited by the equilibrium between CaO, $CO_2$, and $CaCO_3$, which allows for $CO_2$ capture efficiency higher than 85% at high temperatures. Various approaches have been investigated for improving the performance of CaO-based sorbents by increasing porosity and stability. Gupta and Fan ("Carbonation/Calcination Cycle Using High Reactivity Calcium Oxide for Carbon Dioxide Separation from Flue Gas," *Ind. Eng. Chem. Res.* 41:4035-42 (2002)) synthesized high surface area CaO sorbents from precipitated calcium carbonate (PCC). Recently, Smirniotis and his coworkers (Lu, et al., "Relationship between Structural Properties and $CO_2$ Capture Performance of CaO-Based Sorbents Obtained from Different Organometallic Precursors," *Ind. Eng. Chem. Res.* 47:6216-20 (2008)) obtained high performance CaO-based sorbents derived from different organometallic precursors. Some have promoted CaO sorbents by using additives, such as NaCl or $Na_2CO_3$, while others have improved the sorbent capacity by doping with alkali metals, yielding sorbents that are inferior in both capacity and durability. Intermediate hydration treatment between consecutive carbonation and regeneration cycles was also employed by Kuramoto et al. ("Repetitive carbonation-calcination reactions of Ca-based sorbents for efficient $CO_2$ sorption at elevated temperatures and pressures," *Ind. Eng. Chem. Res.* 42:975-91 (2003)) to improve $CO_2$ capture capacity and enhance durability of CaO sorbents. However, the disadvantage associated with conventional CaO-based sorbents is that their real time performance decays with each passing cycle. Based on an empirical equation, calcium oxide carbonation conversion decays quite rapidly to <20% within the first 20 cycles.

CaO-based sorbents have conventionally been synthesized by wet chemical and/or solid state processes. Synthesis methodology and process conditions strongly influence the physicochemical properties of the resulting materials such as phase composition, crystalline size, surface area, redox ability, and sorption capacity. The need persists to develop an efficient and cost effective preparation method to obtain thermally stable, highly active sorbents for the capture of $CO_2$.

Flame spray pyrolysis (FSP) is a cost effective option for large scale production of thermally stable, high surface area nanomaterials. See Strobel, et al., "Flame aerosol synthesis of smart nanostructured materials," *J. Mater. Chem.* 17:4743-56 (2007). Surprisingly, it has been found that the FSP-derived refractory doped CaO sorbents of the present invention retain functionality and resist sintering at high temperatures, including temperatures above the Tammann temperature of $CaCO_3$. Further, the FSP-derived refractory doped CaO sorbents exhibit stability under severe operating conditions, such as the presence of 10 vol. % water, and lack affinity for oxygen and nitrogen gas.

In one embodiment of the present invention, a sorbent for the capture of carbon dioxide ($CO_2$) from gas comprising $CO_2$ is provided, the sorbent comprising calcium oxide (CaO) and at least one refractory dopant. In a specific embodiment, the at least one refractory dopant has a Tammann temperature greater than about 530° C., wherein the refractory dopant enhances resistance to sintering, thereby conserving a nanostructure of the sorbent at temperatures of at least about 530° C. In another embodiment, the refractory dopant conserves the performance of the sorbent by maintaining the $CO_2$-capturing properties of the sorbent at high temperatures and under extreme operating conditions. In still another embodiment, the at least one refractory dopant has a Tammann temperature greater than about 533° C.

In another embodiment, the refractory dopant comprises a metal selected from the group consisting of silicon, titanium, chromium, cobalt, cerium, zirconium, and mixtures thereof. In a specific embodiment, the refractory dopant comprises zirconium. In another specific embodiment, the refractory dopant is a metal oxide comprising silicon, titanium, chromium, cobalt, cerium, or zirconium, or mixtures thereof. In still another embodiment, the sorbent comprises at least two refractory dopants. In still another embodiment, the sorbent further comprises a dopant conferring sulfur-tolerance to the sorbent. Suitable dopants conferring sulfur-tolerance include, but are not limited to, metal oxides comprising manganese, cerium, chromium, cobalt, copper, and mixtures thereof.

In one embodiment, the sorbent has a metal to calcium atomic ratio of about 1:1, about 1:5, about 1:10, about 3:10, about 1:20, or about 1:50. In a specific embodiment, the atomic ratio of zirconium to calcium is about 3:10.

In another embodiment, the sorbent exhibits a substantially constant carbonation capacity during repeated cycles of carbonation and regeneration. In a specific embodiment, the carbonation capacity is at least about 60%. In a more specific embodiment, the carbonation capacity is about 64%. In another embodiment, the carbonation capacity remains substantially constant at temperatures of from about 200° C. to about 800° C.

In yet another embodiment of the invention, the sorbent exhibits a substantially constant carbonation capacity during repeated cycles of carbonation and regeneration in the presence of water vapor. In a specific embodiment, the sorbent captures $CO_2$ from gas comprising up to about 10 vol. % water vapor.

In another embodiment, the FSP-derived sorbent has a specific surface area of at least about 40 $m^2/g$. In a specific embodiment, the FSP-derived sorbent has a specific surface area of at least about 60 $m^2/g$. In a more specific embodiment, the FSP-derived sorbent has a specific surface area of from about 70 to about 100 $m^2/g$.

In still another embodiment, the FSP-derived sorbent has a pore volume of at least about 0.2 $cm^3/g$. In a specific embodiment, the FSP-derived sorbent has a pore volume of from about 0.2 to about 0.5 $cm^3/g$.

Advantageously, it has also been discovered that the instant FSP-derived refractory-doped CaO sorbents substantially lack affinity for oxygen and nitrogen gases. Accordingly, in another embodiment, the sorbent substantially lacks affinity for oxygen ($O_2$) and nitrogen ($N_2$).

In another embodiment, a method is provided for capturing $CO_2$, the method comprising contacting a gas stream comprising $CO_2$ with a sorbent comprising calcium oxide (CaO) and at least one refractory dopant. The "contacting" step can be accomplished in various different ways, known to the skilled artisan. For example, the refractory-doped sorbent can be incorporated into post- or pre-combustion processes, in a variety of forms. In one embodiment, the refractory-doped sorbent is a fluidized bed. In another embodiment, the sorbent is in pellet form. In a specific embodiment, the at least one refractory dopant has a Tammann temperature greater than about 530° C., wherein the refractory dopant enhances resistance to sintering, thereby conserving a nanostructure of the sorbent at temperatures of at least about 530° C. In a specific embodiment, the capture of $CO_2$ increases monotonically as temperature increases.

The FSP-derived CaO-based sorbents of the present invention are suitable for use in a wide variety of industrial applications, including but not limited to fossil fuel combustion, fossil fuel reforming, and gasification. The FSP-derived sorbents are suitable for use in any processes which produce large quantities of $CO_2$, including but not limited to power plants, cement plants, steel plants, and the like; post-combustion processes capturing $CO_2$ after fuel burns; and pre-combustion processes (IGCC) capturing $CO_2$ before fuel burns.

In another embodiment of the present invention, a process for manufacturing a sorbent for the capture of $CO_2$ from gas comprising $CO_2$ is provided, the process comprising flame spray pyrolysis of a calcium precursor and at least one refractory dopant precursor to provide a refractory-doped nanoparticulate CaO sorbent. In a specific embodiment, the refractory-doped nanoparticulate CaO sorbent comprises particles of from about 1 nm to about 100 nm. In a more specific embodiment, the refractory-doped CaO sorbent comprises particles of from about 5 nm to about 50 nm in diameter. In an even more specific embodiment, the refractory-doped CaO sorbent comprises particles of from about 5 nm to about 20 nm in diameter.

The present invention also provides CaO-based sorbents resistant to sulfation by $SO_2$. The products of reaction between CaO and $SO_2$ stream are a mixture of $CaSO_4$, $CaSO_3$, and CaS at temperatures between 560 and 830° C. In addition, $SO_2$ can also react with the $CaCO_3$ formed as a result of the carbonation reaction between CaO and $CO_2$, thereby causing direct sulfation of the carbonate. These reactions are stoichiometrically represented as
Carbonation (adsorption):

$$CaO + CO_2 \rightarrow CaCO_3 \quad (1)$$

CaO sulfation:

$$CaO + SO_2 \rightarrow CaSO_3 \quad (2)$$

$$4CaO + 4SO_2 \rightarrow 3CaSO_3 + CaS \quad (3)$$

$$4CaSO_3 \rightarrow 3CaSO_4 + CaS \quad (4)$$

$CaCO_3$ sulfation:

$$CaCO_3 + SO_2 \rightarrow CaSO_3 + CO_2 \quad (5)$$

The amount of $CaSO_3$ tends to decrease due to reaction (4). After the adsorption, the sorbent must be regenerated. This is typically carried out by calcining the sorbent at higher temperatures, or swinging the reaction gas to vacuum or inert gas, in order to regenerate the sorbent and to produce concentrated $CO_2$ for further compressing. Processes adopting these procedures are known as temperature swing adsorption (TSA) or pressure swing adsorption (PSA), respectively. The regeneration of carbonate is shown below:
Regeneration (decarbonation, desorption):

$$CaCO_3 \rightarrow CaO + CO_2 \quad (6)$$

Most $SO_2$ sorbents are not suitable for regeneration, due to the properties of sulfates. As such, $SO_2$ sorbents are often manufactured using low cost, single use materials. $CO_2$ sorbents, however, are manufacture using more expensive, regenerable materials. CaO sorbents are effective for the capture of $CO_2$, but are also susceptible to sulfation by $SO_2$ in the gas stream. Accordingly, it is advantageous to develop a doped CaO sorbent having a high capacity for $CO_2$ capture, while simultaneously resisting sulfation from $SO_2$ in a gas stream.

Accordingly, in one embodiment of the present invention, a sorbent is provided for the capture of carbon dioxide ($CO_2$) from gas comprising $CO_2$ and $SO_2$, the sorbent comprising calcium oxide (CaO) and at least one metal oxide dopant, wherein the metal oxide dopant enhances sorbent resistance to sulfation, thereby conserving the $CO_2$ capturing properties of the sorbent in the presence of $SO_2$. In a specific embodiment, the metal oxide dopant comprises metal selected from the group consisting of manganese, cerium, chromium, cobalt, copper, and mixtures thereof. In a more specific embodiment, the metal oxide dopant comprises cerium. In a very specific embodiment, the metal oxide dopant is cerium oxide.

In another embodiment of the invention, the metal dopant has a metal to calcium atomic ratio of about 1:1, about 1:5, about 1:10, about 3:10, about 1:20, or about 1:50. In a more specific embodiment, the atomic ratio of cerium to calcium is about 1:10.

In another embodiment, the sorbent further comprises at least one refractory dopant, wherein the refractory dopant comprises a metal selected from the group consisting of silicon, titanium, chromium, cobalt, cerium, zirconium, and mixtures thereof.

A method for capturing $CO_2$ in the presence of $SO_2$ is also provided, the method comprising contacting a gas stream comprising $CO_2$ and $SO_2$ with a sorbent comprising calcium oxide (CaO) and at least one metal oxide dopant, wherein the metal oxide dopant enhances sorbent resistance to sulfation, thereby conserving the $CO_2$ capturing properties of the sorbent in the presence of $SO_2$. The "contacting" step can be accomplished in various different ways, known to the skilled artisan. For example, the sulfur tolerant doped sorbent can be incorporated into post- or pre-combustion processes, in a variety of forms. In one embodiment, the sulfur tolerant doped sorbent is a fluidized bed. In another embodiment, the sorbent is in pellet form. In a specific embodiment, the capture of $CO_2$ increases monotonically as temperature increases.

The sulfur tolerant CaO-based sorbents of the present invention are suitable for use in a wide variety of industrial applications, including but not limited to fossil fuel combustion, fossil fuel reforming, and gasification. The sulfur tolerant sorbents are suitable for use in any processes which produce $CO_2$ and $SO_2$, including but not limited to power plants, cement plants, steel plants, and the like; post-combustion processes capturing $CO_2$ after fuel burns; and pre-combustion processes (IGCC) capturing $CO_2$ before fuel burns.

The sulfur tolerant CaO-based sorbents of the present invention can also be synthesized by flame spray pyrolysis, providing doped CaO-based sorbents exhibiting durability at high temperatures and conserved $CO_2$-capturing properties in the presence of water vapor. Accordingly, in another embodiment, a process is provided for manufacturing a sorbent for the capture of $CO_2$ from gas comprising $CO_2$ and $SO_2$, the process comprising flame spray pyrolysis of a calcium precursor and a metal oxide dopant precursor to provide a metal oxide-doped nanoparticulate CaO sorbent exhibiting thermal stability, high performance in the presence of water vapor, and resistance to sulfation in the presence of $SO_2$. In a specific embodiment, the metal oxide-doped nanoparticulate CaO sorbent comprises particles of from about 1 nm to about 100 nm. In a more specific embodiment, the metal oxide-doped CaO sorbent comprises particles of from about 5 nm to about 50 nm in diameter. In an even more specific embodiment, the metal oxide-doped CaO sorbent comprises particles of from about 5 nm to about 20 nm in diameter. In still another embodiment, the sorbent further comprises at least one refractory dopant.

EXAMPLES

The following examples are given by way of illustration and are in no way intended to limit the scope of the present invention.

Example 1

Synthesis of FSP-Derived CaO-Based Sorbents

FIG. 1 provides a schematic representation of the FSP technique. The spray apparatus consists of a syringe infusion pump, mass flow controllers, and a FSP reactor which is made from two concentric tubes and an annular tube with pores (0.37 mm) surrounding the two inner tubes. One inner tube has an inner diameter of 1.02 mm; the other one has an inner diameter of 0.51 mm (outer diameter of 0.82 mm). A low-cost Ca-naphthenate precursor (~4% calcium in mineral spirits) and the calculated refractory dopant precursor are dissolved in xylene and fed (1 to 5 ml min$^{-1}$) by a syringe pump through the spray nozzle, which has an outer diameter of 0.82 mm and an inner diameter of 0.51 mm. The feed is dispersed into fine droplets by using 5 L min$^{-1}$ oxygen flowing through an annular gap of 0.28 mm$^2$ between the concentric inner tube and the outer tube (inner diameter of 1.02 mm). The pressure drop of the dispersion oxygen at the nozzle tip is monitored by a pressure gauge and maintained at 1.5 bar. Refractory dopant precursors include zirconyl (IV) 2-ethylhexanoate (6% Zr in mineral spirit), cobalt 2-ethylhexanoate (12% Co in mineral spirit), cerium (III) 2-ethylhexanoate (12% Ce in mineral spirit), chromium (III) 2-ethylhexanoate (8-10% Cr in mineral spirit), titanium isopropoxide (97%), and tetraethyl orthosilicate (98%). The resulting spray is ignited and maintained by a premixed (400 ml min$^{-1}$ CH$_4$ and 400 ml min$^{-1}$ O$_2$) flame ring surrounding the spray nozzle with an outer radius of 10 mm. The gas flows are monitored by calibrated mass flow controllers. With the aid of a vacuum pump, product particles are collected on a glass fiber filter paper (GF/D Whatmann, 257 mm in diameter) placed on a holder 120 mm above the reactor. The skilled artisan will appreciate that the liquid feed rate may be varied in order to obtain desirable product particle characteristics.

Example 2

Synthesis of Wet Chemistry-Derived CaO-Based Sorbents

Predetermined quantities of calcium nitrate (Fisher) and zirconyl nitrate (Aldrich) were dissolved in 200 ml DI water. The mixture solution was stirred rigorously using a magnetic stir bar. Calculated amount of ammonium carbonate solution (Aldrich) was then added drop-wise to the mixture solution. After the addition of (NH$_4$)$_2$CO$_3$ solution, the slurry was left to stir for about 1 hour and subsequently aged over night. Thereafter, the resulting slurry was filtered, dried at 80° C. and calcined in air at 900° C. for one hour (ramp rate of 10° C. min$^{-1}$).

Example 3

Performance Tests

The denotation of M/Ca (x:y) (M=Si, Ti, Cr, Co, Zr, & Ce) has been adopted to represent the specific dopant-incorporated CaO-based sorbents, where (x:y) represents the relative atomic ratio of a specific dopant with respect to Ca. The sorbent performance was evaluated by assessing the maximum amount of CO$_2$ taken up by a given sorbent in a specified time period. During the carbonation cycle, CO$_2$ uptake increases monotonically, attaining the highest value at the end of the cycle. The carbonation reaction is characterized by the reaction of gaseous CO$_2$ with solid CaO to yield CaCO$_3$, which can in turn be thermally regenerated to CaO and CO$_2$ by heating the carbonate beyond its decomposition temperature (i.e., 825° C.). As dopants do not show any affinity for CO$_2$ capture, CaO conversion to CaCO$_3$ was used to estimate the CO$_2$ capture capacity of each sorbent. The molar conversion ($X_{CaO}$) of each sorbent was obtained based on the CaO carbonation by using the following equation:

$$X_{CaO}\% = \frac{D*F_d + C*F_{CaO}}{C*F_{CaO}*X_t} * W_{CaO}\%$$

where D is the molar fraction of the dopant in a sorbent, $F_d$ is the formula weight of a dopant, C is the molar fraction of CaO in a sorbent, $F_{CaO}$ is the formula weight of CaO, $X_t$ is the theoretical molar conversion of CaO to CaCO$_3$, and $W_{CaO}$ is the percentage weight change of a sorbent during the reactions.

Sorbent performance was tested with a Perkin-Elmer Pyris™-1 thermogravimetric analyzer (TGA), a Perkin Elmer thermal analysis gas station (TAGS) and software of Pyris™ v3.8 from Perkin Elmer. The microbalance of the Pyris™-1 TGA operates as a high gain electromechanical servo system which permits detection of weight changes versus time as small as 0.1 μg. The TAGS has four gas channels and can automatically switch between any of them, according to the reaction program. The switch and flow of CO$_2$ (99.5%, Wright Bros, Inc.) and helium were accurately maintained by TAGS.

Carbonation and decarbonation, including the heating of the sample, the cooling of sample and the shifting gases between CO$_2$ and helium were programmable and operated batch-wise. Small amount of sorbent (weight ranging from 4 to 8 mg) was placed in a platinum sample pan and heated up to the carbonation temperature at a ramp rate of 10° C. min$^{-1}$. Once the sample temperature reached the desired carbonation temperature, the program was automatically switched to perform carbonation (i.e., introduce CO$_2$ stream). Carbonation time spanned anywhere between 5 to 300 minutes, shorter times were chosen to get a quick response equilibrium curve, while longer periods were used to yield relatively mature isotherm equilibrium. All carbonation atmosphere were 30 vol. % CO$_2$ balanced in helium unless otherwise specified. Decarbonation was carried out for 30 minutes at 700° C. in helium unless otherwise specified. During the entire cyclic carbonation-decarbonation step, the sorbent weight and temperature were continuously monitored as a function of time and stored accordingly.

Figure 2:
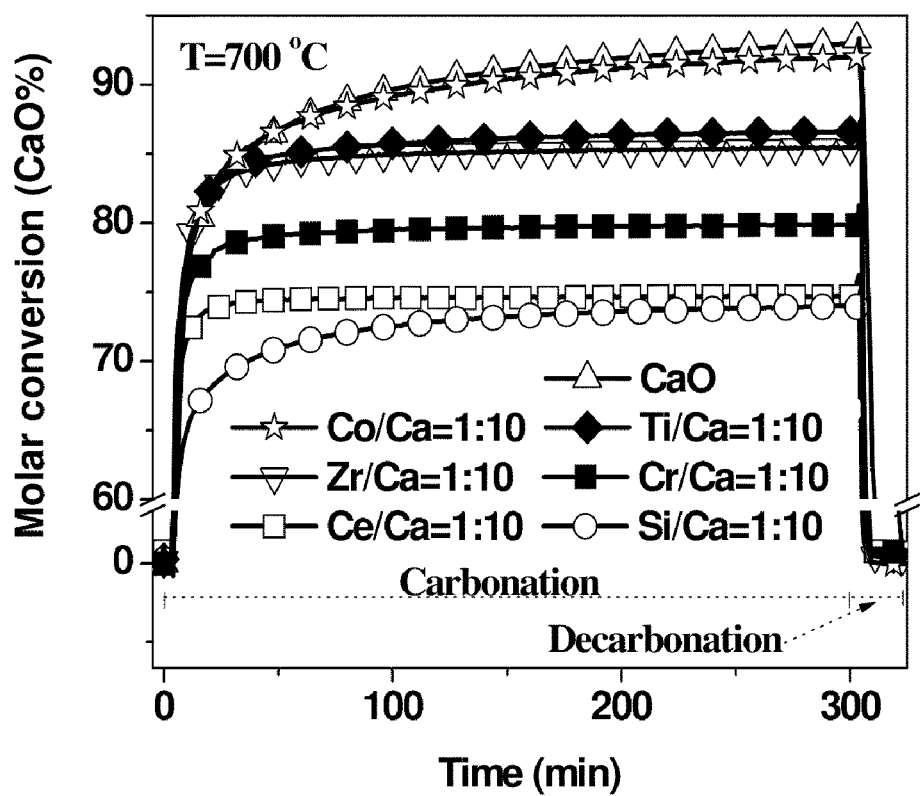
FIG. 2. Capture of CO$_2$ over FSP-derived sorbents at 700° C. Exhibiting rapid carbonation during early reaction, the sorbents were carbonated in 30 vol. % CO$_2$ gas stream and completely regenerated in helium.

FIG. 2 depicts the performance results for the FSP-derived M/Ca sorbents (M=Si, Ti, Cr, Co, Zr, and Ce). Nearly complete regeneration of CaCO$_3$ to CaO was observed, demonstrating the reversible nature of the cyclic carbonation-decarbonation reaction for the refractory-doped CaO sorbents.

As FIG. 2 demonstrates, carbonation takes place in two stages. During the rapid phase of carbonation, a surface reaction takes place between CO$_2$ and CaO leading to the formation of surface CaCO$_3$. The second stage of carbonation is slower, as the CO$_2$ must diffuse through a layer of nascent CaCO$_3$ in order to reach the unconverted CaO core. Pristine CaO (dopant free) and doped CaO with cobalt oxide, titania, and zirconia dopants, exhibit highest $CO_2$ uptake (~85% molar conversion) during a 300 min carbonation. A majority of the carbonation takes place during the initial stage (rapid). Within two minutes of the initial carbonation, the conversion of sorbents has reached as high as 60%; within five minutes of decarbonation, the sorbents could be completely regenerated from carbonate.

Example 4

Endurance Testing of Pristine CaO Sorbent

Figure 3:
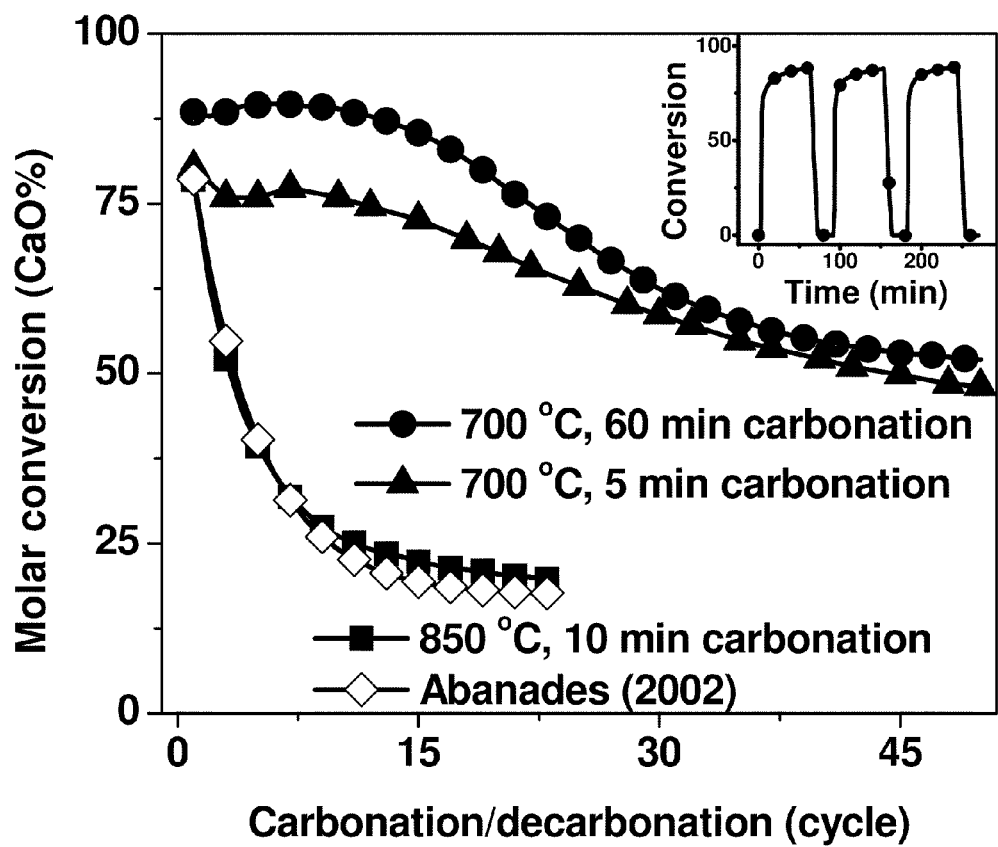
FIG. 3. Results for extended operation cycles with FSP-derived CaO during various operation conditions. The figure includes, for comparison purposes, results summarized from a wide various literatures by Abanades ("The maximum capture efficiency of CO$_2$ using a carbonation/calcination cycle of CaO/CaCO$_3$," Chem. Eng. J. 90:303-06 (2002)).

FIG. 3 depicts the evolution of a reversible carbonation-decarbonation reaction. The inset shows that the carbonation proceeds in two stages and is followed by complete regeneration. All curves in FIG. 3 demonstrate that performance deteriorates with time (number of cycles). For the FSP-derived pristine CaO, the highest uptake of about 90% was noted in the first 10 cycles with 60 min carbonation period. However, the uptake declined to 60% during next 40 cycles, after which the sorbent performance stabilized at ~50% uptake after 50 cycles. When the carbonation time was reduced to five minutes, the maximum uptake also decreased. However, the $CO_2$ uptake gradient between these two operation conditions diminished with the progress of time (number of cycles). In another experiment, where the temperature of carbonation was raised to 850° C., rapid performance deterioration was observed (from 78% to 20%) and the operation was eventually terminated after 25 cycles. This can be attributed to severe sintering among the sorbent particles, thus limiting further carbonation.

Example 5

Endurance Testing of FSP-Derived CaO-Based Sorbents

Figure 4:
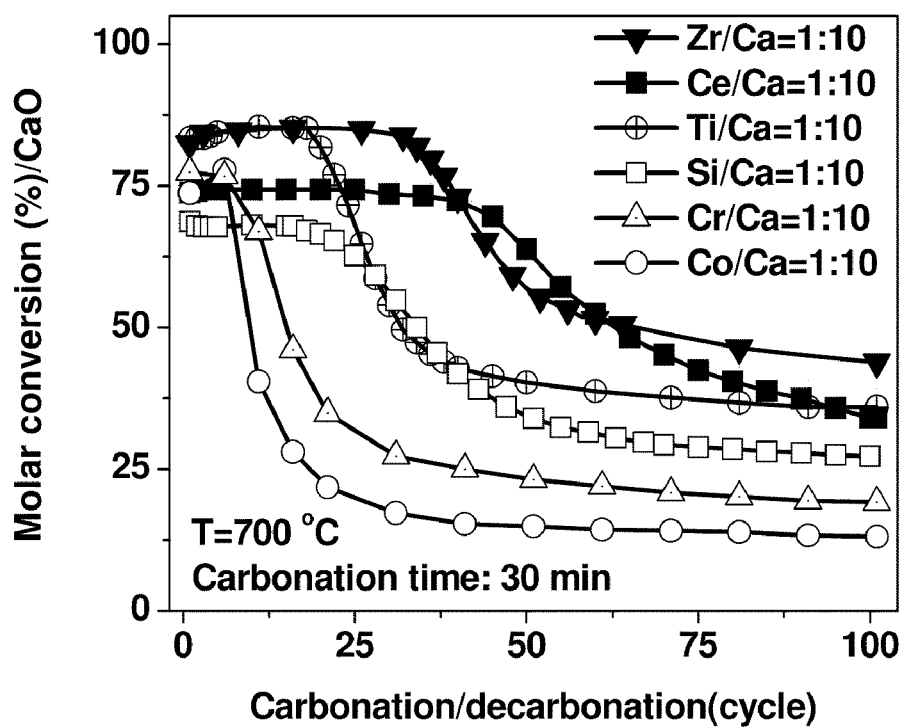
FIG. 4. Extended operation cycles of FSP-derived sorbents doped with various metal oxides.

Refractory dopant-incorporated CaO sorbents were tested in multi-cyclic operation. FIG. 4 depicts the endurance testing results for the FSP-derived CaO sorbents M/Ca (M=Zr, Ce, Ti, Si, Cr, Co). All the sorbents exhibit greater than 70% conversion in the initial few cycles and were also regenerated completely during decarbonation. After six cycles, the performance of Cr/Ca and Co/Ca sorbents began to deteriorate and reached 19% and 13% after 100 cycles, respectively. The capacity of the other M/Ca (Si, Ti, Ce, Zr) sorbents began to decay at later stages. All sorbents exhibit a similar trend, wherein performance decays rapidly after a given number of cycles and then stabilizes. Among the sorbents evaluated, Zr/Ca (1:10) displayed the best performance. Its molar conversion reached ~83% during the initial 32 cycles, after which a slow decay was noted. After 100 cycles, the Zr/Ca sorbent still maintained a maximum conversion of 44%.

Example 6

Optimizing the Zr Concentration in the CaO Matrix

Figure 5:
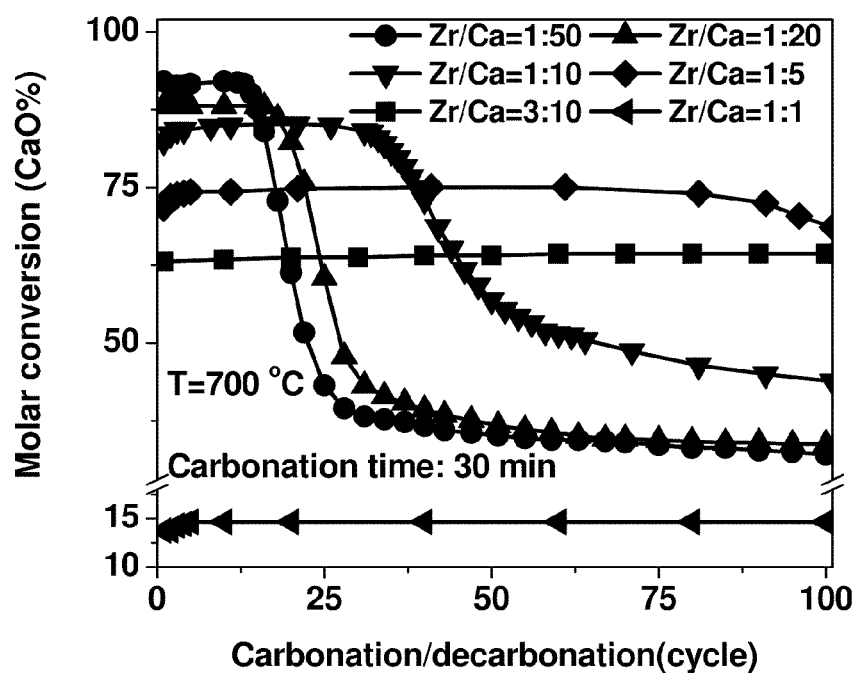
FIG. 5. The evolution of CO$_2$ capture capacity of FSP-derived Zr/Ca sorbents with cycles at 700° C.

A series of Zr-incorporated CaO dopants were synthesized by varying the relative composition of Zr in the CaO base matrix. FIG. 5 illustrates that the sample with lower Zr content exhibits greater CaO conversion during the initial stages. By decreasing the molar ratio of Zr/Ca from 1:1, 3:10, 1:5, 1:10, 1:20, to 1:50, the initial conversions increased in the order of 14%, 64%, 72%, 83%, 88%, to 92%, respectively (see Table 2, below).

TABLE 2

Performance of FSP-derived Zr/Ca sorbents during 100 cycles

| Zr/Ca ratio | $X_{CaO}$, $1^{st}$ carbonation | $X_{CaO}$, $100^{th}$ carbonation | The cycle $X_{CaO}$ started to decrease | Ratios of the $X_{CaO}$, $100^{th}$ to the $X_{CaO}$, $1^{st}$ |
|---|---|---|---|---|
| 1:1 | 14% | 16% | N.O.[a] | 114% |
| 3:10 | 64% | 64% | N.O.[a] | 100% |
| 1:5 | 72% | 68% | ~80 | 92% |
| 1:10 | 83% | 44% | ~30 | 53% |
| 1:20 | 88% | 34% | ~16 | 39% |
| 1:50 | 92% | 32% | ~13 | 35% |

[a]Not observed.

Interestingly, the carbonation conversions of the Zr/Ca (3:10) sorbent did not decay, even after 100 cycles. Although the Zr/Ca (1:1) also did not show any sign of performance decay, its overall capacity is much lower than that of Zr/Ca (3:10). The Zr/Ca (1:1) has the least amount of free CaO available among the various Zr/Ca sorbents tested. The smaller the amount of available CaO, the lower the performance.

Although not wishing to be bound by theory, it is believed that the formation of calcium zirconate restrains the growth of CaO grains, thus restricting the sintering-agglomeration effect. The present study suggests that Zr/Ca in the 3:10 atomic ratio results in the formation of a robust sorbent for multi-cyclic operation.

Example 7

Comparison of FSP-Derived Zr/Ca Sorbent and Wet Chemistry Zr/Ca Sorbent

Figure 6:
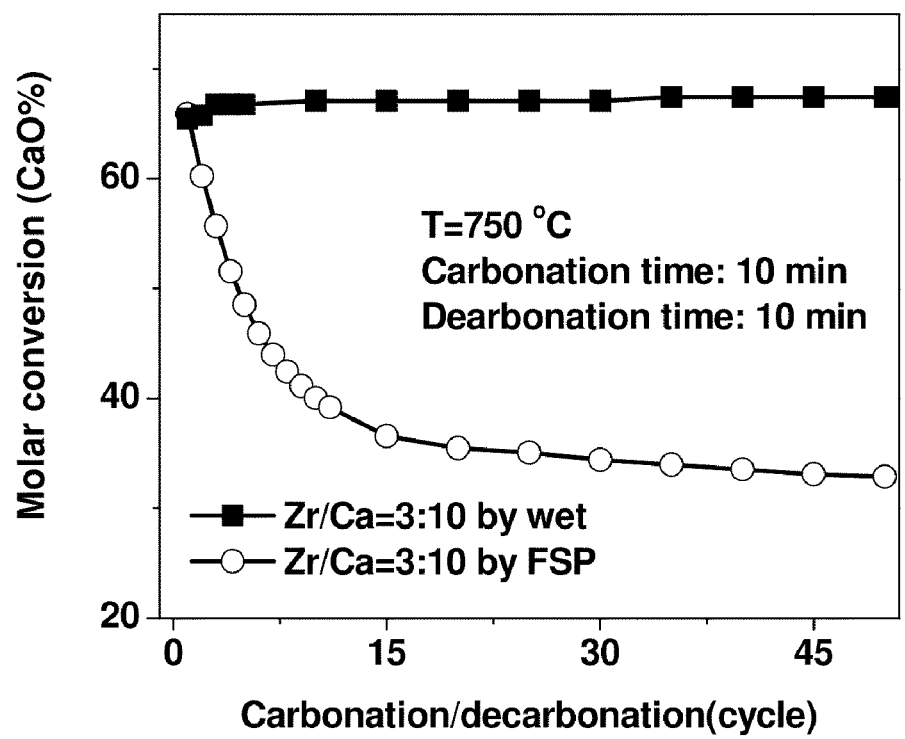
FIG. 6. Extended operation cycles with Zr/Ca sorbents by wet impregnation.

In order to study the impact of synthesis route on the sorbent performance, a sample of Zr/Ca (3:10) was prepared by conventional wet chemistry and compared with FSP-derived Zr/Ca (3:10). As noted in FIG. 6, the wet chemistry-derived sorbent exhibits poor performance as compared to FSP-derived sorbent over repeated carbonation/decarbonation cycles. The poor performance can be attributed to the lower specific surface area, pore volume of the sample, and to the preparation method (see Example 8 below). The inherent robustness and thermal stability of the FSP-derived sorbents are due to the fact that these materials experience very high temperatures and rapid cooling rates during the course of synthesis. The rapid heating/cooling during synthesis stabilizes the structure of the material, thereby imparting robustness.

Example 8

Physical Characterization of FSP-Derived Sorbents: SSA and Pore Size

The BET surface area and pore size distribution analyses were conducted by $N_2$ physisorption at liquid $N_2$ temperature using a Micromeritics ASAP 2010 apparatus. The SSA measurements were determined from a six-point $N_2$ adsorption isotherm recorded in a relative partial pressure ($p/p_0$) range 0.05 to 0.25. The pore volume was obtained by calculation of single point adsorption at the relative pressure about 0.99. Prior to analyses, all the samples were degassed at 300° C. under vacuum before analysis.

The BET specific surface area (SSA) and pore volumes are described in Table 3, below.

TABLE 3

The BET SSA and Pore Volume of Various sorbents by FSP and Wet Chemical Routes

| Sorbent | Specific surface area ($m^2 g^{-1}$) | Pore volume ($cm^3 g^{-1}$) |
|---|---|---|
| FSP Si/Ca(1:10) | 78 | 0.34 |
| FSP Ti/Ca(1:10) | 61 | 0.38 |
| FSP Cr/Ca(1:10) | 74 | 0.39 |
| FSP Co/Ca(1:10) | 80 | 0.42 |
| FSP Ce/Ca(1:10) | 89 | 0.42 |
| FSP Zr/Ca(1:10) | 74 | 0.23 |
| FSP Zr/Ca (1:5) | 67 | 0.23 |
| FSP Zr/Ca (3:10) | 71 | 0.24 |
| Wet Zr/Ca (3:10) | 6.8 | 0.07 |
| PCC(Gupta et al 2002) | 38 | 0.11 |

Ce-incorporated sorbent exhibits the highest surface area and porosity among the various sorbents analyzed. The BET SSA values of conventional wet chemistry-derived sorbents are also shown in Table 3. BET SSA and pore volume of the various FSP-derived sorbents are much larger (about 10 times) than those derived by wet chemistry. Gupta and Fan synthesized a series of sorbents by various routes and a variety of CaO precursors, of which the precipitated calcium carbonate (PCC)-derived sorbents demonstrated the best performance. The BET SSA and pore volume values obtained on the present FSP derived sorbents are two times greater than that of the PCC sorbents obtained by Gupta and Fan (Table 3).

Example 9

Performance of Zr/Ca Sorbent under Severe Operating Conditions

Figure 7:
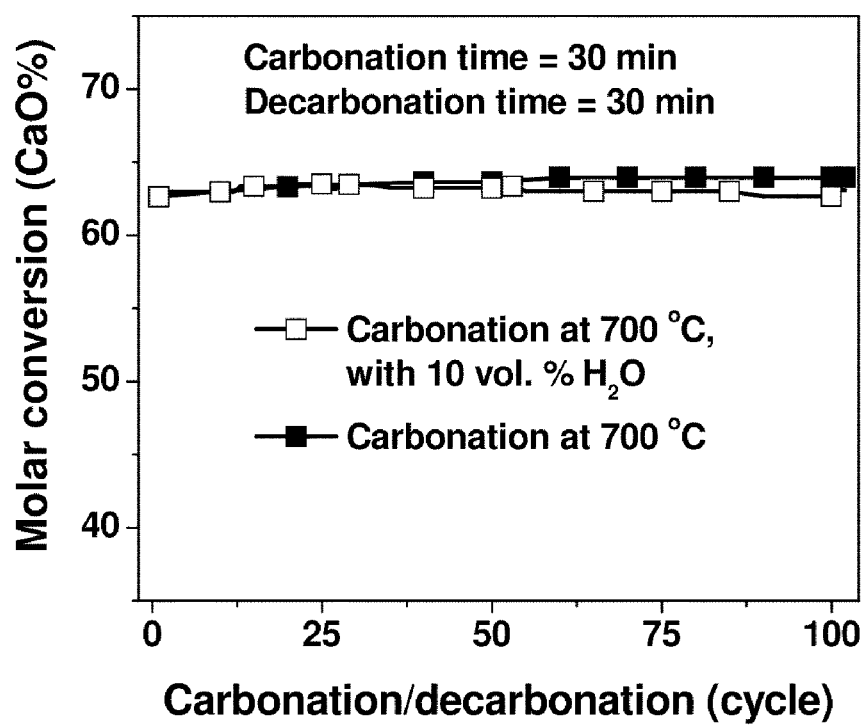
FIG. 7. Extended operation cycles with FSP-derived Zr/Ca (3:10) in the presence of water vapor at 700° C. The sorbents were carbonated 30 minutes with 30 vol. % CO$_2$ at 700° C. (solid square), or 30 vol. % CO$_2$ and 10 vol. % H$_2$O at 700° C. (empty square).

FIG. 7 demonstrates the performance of FSP-derived Zr/Ca (3:10) in the presence of water vapor at 700° C. The sorbents were carbonated 30 minutes with 30 vol. % $CO_2$ at 700° C. (solid square), or 30 vol. % $CO_2$ and 10 vol. % $H_2O$ at 700° C. (empty square).

Figure 8:
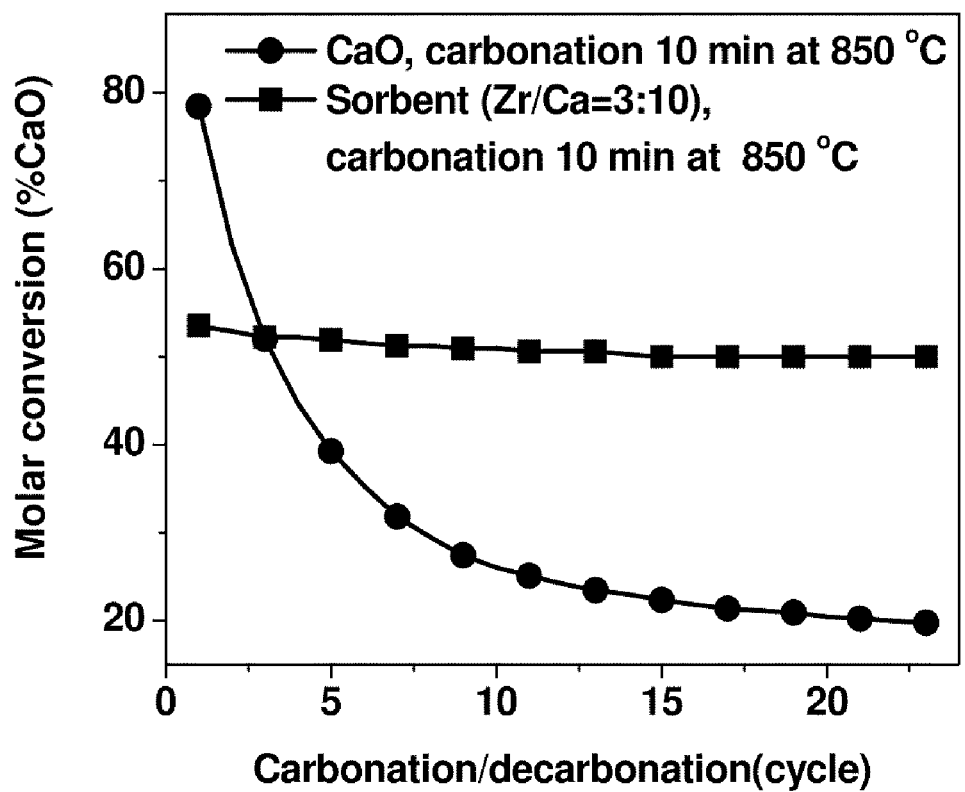
FIG. 8. Extended operation cycles with FSP-derived CaO and Zr/Ca (3:10) at 850° C. The sorbents were carbonated in CO₂ atmosphere and decarbonated in 30 vol. % CO₂ balanced in helium. Decarbonation was fulfilled during a temperature ramp heating up from 850 to 950° C. and then back to 850° C.

FIG. 8 demonstrates the performance of Zr/Ca (3:10) at 850° C. The sorbents were carbonated in $CO_2$ atmosphere and decarbonated in 30 vol. % $CO_2$ balanced in helium. Decarbonation was carried out during a temperature ramp heating up from 850 to 950° C. and then back to 850° C.

The performance of the Zr/Ca (3:10) FSP-derived sorbent was found to be stable in the presence of water vapor (FIG. 7, open symbol) and was comparable with the performance in the absence of water vapor (FIG. 7, solid symbol). FIG. 8 shows the performance tests carried out at 850° C. with shorter carbonation-decarbonation cycles. The carbonation stream employed is comprised of pure $CO_2$ (99.9% purity) instead of 30 vol. % $CO_2$ due to equilibrium limitations between CaO, $CO_2$, and $CaCO_3$. The decarbonation was conducted at 950° C. The Zr/CaO (3:10) FSP-derived sorbent was capable of maintaining 50% conversion even after 23 cycles, which is two times more than that of FSP-made pristine CaO sorbent under identical operating conditions. Results indicate Zr/Ca (3:10) FSP-derived sorbents maintain high reversibility under severe operating conditions.

Example 10

Sulfur Tolerant Sorbent Preparation

A series of selected metal-promoted calcium-based sorbents with nominal composition of $Ca_{0.9}M_{0.1}O_x$ (where M=Cr, Mn, Co, Cu, and Ce) were prepared in 1:10 (M:Ca) atomic ratio by the co-precipitation method. Nitrate precursors were used for all of the preparations. In a typical preparation, calculated amounts of calcium nitrates and the corresponding promoter metal nitrate were dissolved separately in de-ionized water and then mixed together. Dilute ammonium carbonate was gradually added dropwise to the aforementioned mixture solutions under vigorous stirring until precipitation was complete (pH 8.5). The precipitate gels thus obtained were further aged overnight and filtered off. The resulting cakes were oven-dried at 80° C. for 12 hours and finally calcined at 900° C. for one hour in flowing air. The heating and cooling rates were maintained at 10° C./min.

Example 11

Chemisorption Data for Sulfur Tolerant Sorbents

All carbonation and/or sulfation and regeneration experiments were conducted using a Perkin-Elmer Pyris™-1 thermogravimetric analyzer (TGA). Sorbents were placed in a platinum sample holder with a diameter of 6 mm and heated to 750° C. at 10° C. $min^{-1}$ under helium. During carbonation and/or sulfation, the gas was switched from helium to a gas mixer containing 30 vol % $CO_2$ and/or 1000 ppmv $SO_2$ using helium as balance. Carbonation and/or sulfation, and regeneration lasted 60 minutes and 30 minutes, respectively, at 750° C. The longer reaction times were chosen in order to reach carbonation onset point and achieve maximum capacity of the sorbents, which is a critical characteristic for large scale applications. Sample weight, temperature and time were recorded continually during the entire process.

Example 12

Carbonation/Decarbonation of Doped CaO Sorbents—Absence of $SO_2$

Prior to reaction, each sorbent was subjected to 30 minutes pretreatment in helium stream at 750° C. TGA continuously recorded the weight change of the sample. The % weight increase is calculated according to the following equation:

$$\text{Weight increased \%} = (W_t - W_0) * 100\% / W_0$$

wherein $W_t$ is the sample weight at reaction time t, and $W_0$ the sample weight after pretreatment.

Figure 9:
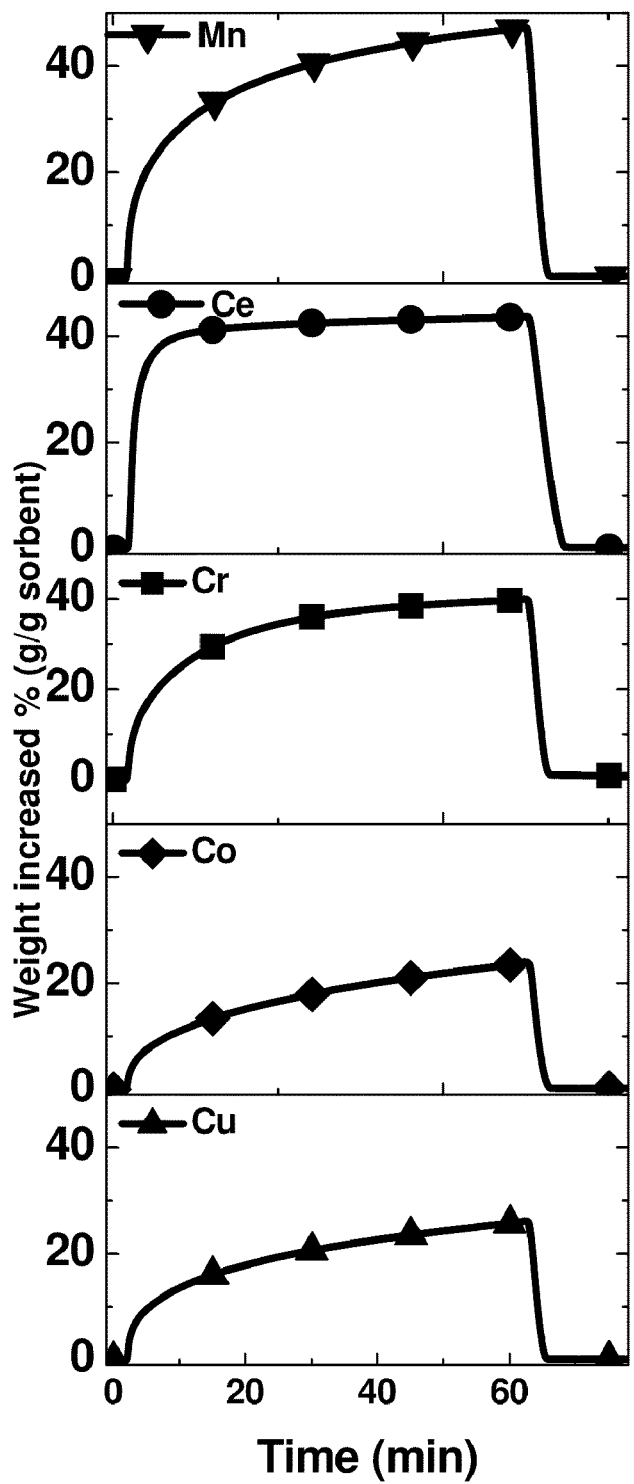
FIG. 9. Carbonation/decarbonation studies over various dopant promoted calcium-based sorbents (Carbonation: 30 vol % CO₂ in helium, 750° C., 60 min; Decarbonation: helium, 750° C., 30 min).

FIG. 9 demonstrates the two-phase carbonation reaction, characterized by a rapid onset phase followed by a slower phase as $CO_2$ must diffuse through the layer of $CaCO_3$ in order to reach the unconverted CaO core. Among the doped sorbents tested, the Ce-promoted sorbent exhibited the fastest kinetics for $CO_2$ capture. Other studies indicate the Ce/Ca sorbent has the highest surface area and largest pore volume (data not shown), which contributes to its reaction kinetics.

During the initial stage of the carbonation (10 minutes), the weight of the Ce/Ca sorbent increased by 40%, while that of the Mn/Ca increased by 28%. For the Cr/Ca, Co/Ca and Cu/Ca sorbents, the weight increases were 25%, 11%, and 14%, respectively. During the decarbonation step following the 60-minute carbonation, all of the sorbents were subjected to helium stream and regenerated almost completely back to CaO within five minutes (FIG. 9). Results indicate there is no apparent residual carbonate remaining in the sorbents after decarbonation.

Example 13

Carbonation/Decarbonation of Doped CaO Sorbents—Presence of $SO_2$

Figure 10:
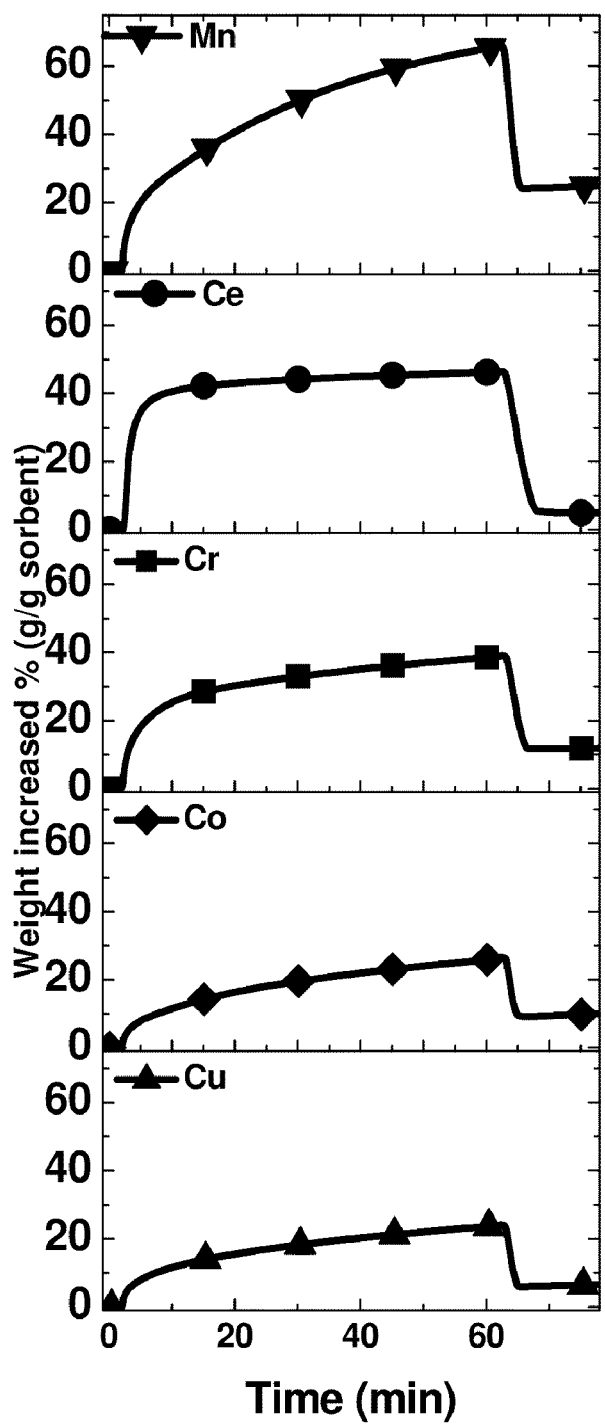
FIG. 10. Simultaneous carbonation/decarbonation and sulfation studies over various dopant promoted calcium-based sorbents (Carbonation/sulfation: 30 vol % CO₂ in helium, 1000 ppmv SO₂, 750° C., 60 min; Regeneration: helium, 750° C., 30 min).

Carbonation was performed in the presence of 1000 ppmv $SO_2$ and 30 vol % $CO_2$ in helium for duration of 60 minutes. Comparing FIGS. 9 and 10, weight increase of all sorbents before regeneration is much higher in the presence of $SO_2$, indicating that carbonation/sulfation takes place simultaneously over the various dopant-promoted sorbents. The Ce/Ca and Mn/Ca sorbents exhibit the maximum $CO_2$ uptake capacity in the presence of 1000 ppmv $SO_2$ (see Table 4, below).

TABLE 4

Relative weight change after carbonation and/or sulfation and regeneration

| sorbent | wt. % increase[a] (g g$^{-1}$) | wt. % increase[b] (g g$^{-1}$) | capacity for $CO_2$ uptake[a] (g g$^{-1}$) | wt. % increase[c] (g g$^{-1}$) | wt. % increase[d] (g g$^{-1}$) | capacity for $CO_2$ uptake[d] (g g$^{-1}$) | wt. % increase[e] (g g$^{-1}$) |
|---|---|---|---|---|---|---|---|
| Mn/Ca | 47 | 0.3 | 47 | 66 | 25 | 41 | 30 |
| Ce/Ca | 44 | 0.1 | 44 | 46 | 5 | 41 | 8 |
| Cr/Ca | 40 | 0.8 | 40 | 39 | 12 | 27 | 13 |
| Co/Ca | 26 | 0.2 | 26 | 27 | 10 | 17 | 16 |
| Cu/Ca | 24 | 0.05 | 24 | 24 | 6 | 18 | 8 |

[a]After carbonation.
[b]After carbonation & regeneration.
[c]After carbonation/sulfation.
[d]After carbonation/sulfation & regeneration.
[e]After sulfation.

The capacity of a sorbent for $CO_2$ capture during the reactions with both $CO_2$ and $SO_2$ was obtained by subtracting the sorbent's permanent weight increase after regeneration from its weight increase before regeneration (Table 4). Although the Mn/Ca sorbent showed the same capacity of 41% for $CO_2$ capture as the Ce/Ca sorbent, its 25% permanent weight gain after regeneration indicates that the sorbent lost more of its reactivity than that of Ce/Ca. The Ce/Ca sorbent exhibits the least residue gain of 5% after regeneration, although it exhibits a high weight increase of 46% after reaction. The Mn/Ca sorbent exhibits the strongest affinity with $SO_2$, while the Ce/Ca sorbent is more resistant to $SO_2$.

Example 14

Sulfation of Doped CaO Sorbents

Figure 11:
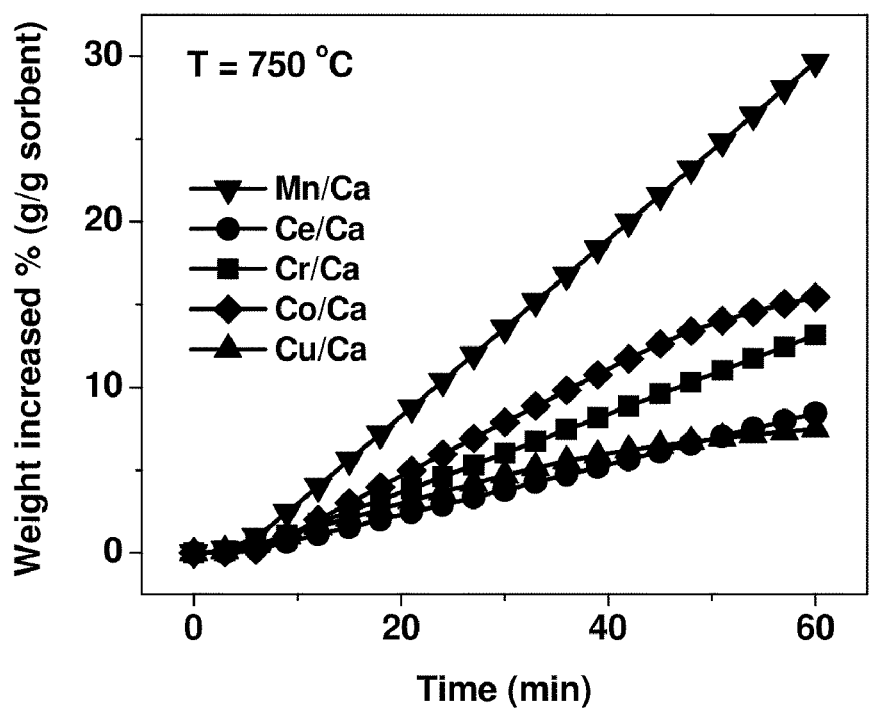
FIG. 11. Sulfation studies over various dopant promoted CaO-based sorbents (Sulfation: 1000 ppmv SO₂ in helium, 750° C., 60 min; Regeneration: helium, 750° C., 30 min).

Doped sorbents were subjected to sulfation in the presence of 1000 ppmv $SO_2$ using helium as balance (FIG. 11). During regeneration after sulfation, no weight loss was observed for the five sorbents during the entire regeneration period (30 minutes), thus indicating that the adsorbed sulfates do not decompose under the experiment conditions (750° C., one bar helium). More permanent weight increase was observed after sulfation as compared with regeneration following carbonation/sulfation, indicating only carbonate was regenerated and the sulfation reactions were not reversible. The Ce/Ca sorbent exhibited the highest degree of sulfur-tolerance, exhibiting the highest $CO_2$ uptake capacity and the least residual weight gain after regeneration; the Mn/Ca sorbent showed the largest weight gain during carbonation/sulfation and maintained the most permanent residual weight after regeneration.

Example 15

FSP-Derived Highly Durable, Sulfur-Tolerant Doped CaO Sorbents

A CaO sorbent doped with both Zr and Ce is prepared by flame spray pyrolysis, comprising a Zr:Ca atomic ratio of 3:10 and a Ce:Ca atomic ratio of 1:10. The carbonation capacity of the Zr/Ce/Ca sorbent is tested at temperatures exceeding 530° C. and the sorbent is found to be robust and thermally stable. The performance of the Zr/Ce/Ca sorbent is assessed in the presence of 10 vol. % water vapor. Results indicate the sorbent maintains high reversibility in the presence of water vapor. Relative weight change after carbonation/regeneration in the presence of $SO_2$ is assessed and the sorbent is found to exhibit a minimal permanent weight gain after 20 cycles, indicating the sorbent is resistant to sulfation.

All documents cited are incorporated herein by reference; the citation of any document is not to be construed as an admission that it is prior art with respect to the present invention.

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

What is claimed is:

1. A sorbent for the capture of carbon dioxide ($CO_2$) from gas comprising $CO_2$, the sorbent comprising calcium oxide (CaO) and at least one refractory dopant having a Tammann temperature greater than about 530° C., wherein the sorbent has a metal to calcium atomic ratio of about 1:1, about 1:5, about 1:10, about 3:10, about 1:20, or about 1:50, wherein the refractory dopant comprises a metal selected from the group consisting of silicon, titanium, chromium, cobalt, cerium, zirconium, and mixtures thereof, and wherein the refractory dopant enhances resistance to sintering, thereby conserving a nanostructure of the sorbent at temperatures of at least about 530° C.

2. The sorbent of claim 1, wherein the refractory dopant comprises zirconium.

3. The sorbent of claim 2, wherein the atomic ratio of zirconium to calcium is about 3:10.

4. The sorbent of claim 1, wherein the sorbent exhibits a substantially constant carbonation capacity during repeated cycles of carbonation and regeneration.

5. The sorbent of claim 4, wherein the carbonation capacity is at least about 60%.

6. The sorbent of claim 4, wherein the carbonation capacity is about 64%.

7. The sorbent of claim 4, wherein the carbonation capacity remains substantially constant at temperatures of from about 200° C. to about 800° C.

8. The sorbent of claim 4, wherein the sorbent exhibits a substantially constant carbonation capacity during repeated cycles of carbonation and regeneration in the presence of water vapor.

9. The sorbent of claim 8, wherein the gas comprising $CO_2$ comprises up to about 10 vol. % water vapor.

10. The sorbent of claim 1, wherein the sorbent has a specific surface area of at least about 40 $m^2/g$.

11. The sorbent of claim 1, wherein the sorbent has a pore volume of at least about 0.2 $cm^3/g$.

12. The sorbent of claim 1, wherein the sorbent substantially lacks affinity for oxygen ($O_2$) and nitrogen ($N_2$).

13. A process for manufacturing a sorbent comprising at least one refractory dopant for the capture of $CO_2$ from gas comprising $CO_2$, the process comprising flame spray pyrolysis of a calcium precursor and at least one refractory dopant precursor to provide a refractory-doped nanoparticulate CaO sorbent, wherein the sorbent has a metal to calcium atomic ratio of about 1:1, about 1:5, about 1:10, about 3:10, about 1:20, or about 1:50, and wherein the refractory dopant has a Tammann temperature greater than about 530° C. and is selected from the group consisting of silicon, titanium, chromium, cobalt, cerium, zirconium, and mixtures thereof, wherein the refractory dopant enhances resistance to sintering, thereby conserving a nanostructure of the sorbent at temperatures of at least about 530° C.

14. A process for manufacturing according to claim 13, wherein the refractory-doped nanoparticulate CaO sorbent comprises particles of from about 5 nm to about 50 nm in diameter.

* * * * *